US009045066B2

(12) United States Patent
Mizuno et al.

(10) Patent No.: US 9,045,066 B2
(45) Date of Patent: Jun. 2, 2015

(54) HEATER CONTROL UNIT AND VEHICLE SEAT HEATER

(71) Applicant: TOYOTA BOSHOKU KABUSHIKI KAISHA, Aichi-ken (JP)

(72) Inventors: Kenichi Mizuno, Toyota (JP); Tomoko Hayakawa, Toyota (JP); Masahiko Onuma, Nagakute (JP); Noriko Ogawa, Miyoshi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 248 days.

(21) Appl. No.: 13/676,765

(22) Filed: Nov. 14, 2012

(65) Prior Publication Data

US 2013/0134150 A1 May 30, 2013

(30) Foreign Application Priority Data

Nov. 30, 2011 (JP) ................................ 2011-262858

(51) Int. Cl.
*H05B 1/02* (2006.01)
*B60N 2/56* (2006.01)

(52) U.S. Cl.
CPC .................................... *B60N 2/5685* (2013.01)

(58) Field of Classification Search
CPC ................. B60N 2/5685; B60N 2/002; B60R 2012/01529; H05B 1/02; H05B 1/0202; H05B 1/0238; H05B 2/0042; H05B 1/0236
USPC .......... 219/202, 203, 497, 494, 501, 507, 508
See application file for complete search history.

(56) References Cited

U.S. PATENT DOCUMENTS

| | | | | |
|---|---|---|---|---|
| 5,948,297 | A * | 9/1999 | Haubner et al. | 219/202 |
| 5,981,918 | A * | 11/1999 | Topp et al. | 219/499 |
| 6,237,675 | B1 * | 5/2001 | Oehring et al. | 165/41 |
| 2004/0011778 | A1 * | 1/2004 | Fristedt | 219/217 |
| 2005/0040682 | A1 * | 2/2005 | Ulbrich | 297/180.12 |
| 2006/0175877 | A1 * | 8/2006 | Alionte et al. | 297/180.14 |
| 2006/0196864 | A1 * | 9/2006 | Horiyama et al. | 219/202 |
| 2012/0234815 | A1 * | 9/2012 | Willey et al. | 219/202 |

FOREIGN PATENT DOCUMENTS

| | | |
|---|---|---|
| JP | 55-159414 | 5/1979 |
| JP | 10-508809 | 9/1998 |
| JP | 2009-283333 A | 12/2009 |
| WO | WO2007/097445 | 8/2007 |

OTHER PUBLICATIONS

Japanese Office Action for JP2011-262858 having a mail date of Mar. 10, 2015, along with an English-language translation thereof.

* cited by examiner

*Primary Examiner* — Mark Paschall
(74) *Attorney, Agent, or Firm* — Greenblum & Bernstein, P.L.C.

(57) ABSTRACT

A heater control unit controls electric power supplied to a heater provided in a seat. The heater control unit includes an outside air temperature measuring portion that measures an outside air temperature, a seat surface temperature measuring portion that measures a surface temperature of the seat, and a control portion. The control portion controls a time for which an initial electric power larger than an electric power in a steady state after the initial state is output to the heater, according to the measured outside air temperature and the measured seat surface temperature in an initial state immediately after the heater is activated.

9 Claims, 7 Drawing Sheets

| | | Outside air temperature $T_A$ −15°C: $t_1$ | Outside air temperature $T_A$ −15°C: $t_2$ | −5°C: $t_1$ | −5°C: $t_2$ | 5°C: $t_1$ | 5°C: $t_2$ | 15°C: $t_1$ | 15°C: $t_2$ | $t_1$ | $t_2$ |
|---|---|---|---|---|---|---|---|---|---|---|---|
| SEAT SURFACE TEMPERATURE $T_S$ | | 30 | 60 | 30 | 60 | 0 | 0 | 0 | 0 | 0 | 0 |
| | 30°C | 70 | 180 | 70 | 180 | 30 | 120 | 30 | 120 | 0 | 0 |
| | 10°C | 140 | 180 | 140 | 180 | 70 | 180 | 30 | 120 | 0 | 0 |

HEATER CONTROL UNIT AND VEHICLE SEAT HEATER

INCORPORATION BY REFERENCE

The disclosure of Japanese Patent Application No. 2011-262858 filed on Nov. 30, 2011 including the specification, drawings and abstract is incorporated herein by reference in its entirety.

BACKGROUND OF THE INVENTION

1. Field of the Invention

The invention relates to a heater control unit and a vehicle seat heater. More particularly, the invention relates to a heater control unit that provides rapid heating ability according to an environmental temperature at startup of a heater provided in a seat, and also to a vehicle seat heater provided with this heater control unit.

2. Description of Related Art

Seat heaters that are provided with a heating element in a sitting surface portion or a backrest of a seat of a vehicle or the like that warms a seated person are being used. With many of these kinds of seat heaters, the temperature is adjusted by changing the amount of power supplied to the heating element, or turning the power to the heating element on or off. For example, Japanese Patent Application Publication No. 2009-283333 (JP 2009-283333 A) describes a heater control unit that keeps an object to be heated at a target temperature by detecting the temperature of a heater, comparing this detected temperature with a target temperature determined beforehand, and controlling a on/off operation of power to the heater. There are also cases in which means for promoting a temperature increase when the heater is turned on (i.e., at startup of the heater) is provided in order to warm a seated person quickly. For example, WO2007/097445 describes a heater unit and the like having excellent rapid warming ability at startup, by providing two heaters and a temperature control unit that controls on/off control that controls the power on or off depending on the temperature.

The heater control unit described in JP 2009-283333 A is provided with a heater, temperature measuring means, temperature controlling means, and an operating switch for starting operation. Turning on the operating switch causes the temperature controlling means to start operation. Then an object to be heated is maintained at a target temperature by comparing a detected temperature obtained from the temperature measuring means with a target temperature determined beforehand, and controlling an on/off operation of power to the heater. Also, the heater control unit described in JP 2009-283333 A may be referred to as an example of related heater control. In this related example, when an operating switch is turned on, a heater is powered up and a timer starts, and the temperature of the heater is detected. Then the detected temperature is compared to a target temperature, a timer time limit is calculated, and when the timer time limit is reached, control is performed to turn off the power supply of the heater. Here, the timer time limit (i.e., the time for which power is supplied, also referred to as the "power-on time") is obtained by the difference between the detected temperature and the target temperature (see FIG. 6 of JP 2009-283333 A). Applying this kind of control method makes it possible to automatically adjust the time that power is supplied to the heater after activation, according to the temperature difference between the detected temperature and the target temperature. However, with a method that controls the power-on time at startup of the heater according to the difference between the detected temperature and the target temperature, the heat provided to a person seated in the seat (i.e., a seated person) may be too much or too little depending on the temperature of the outside air, which is problematic. For example, when uniformly controlling the power-on time or the amount of power at startup from the seat temperature and the target temperature, a seated person may not be sufficiently warmed when both the outside air temperature and the seat temperature are low. Also, when the seat temperature is low but the outside air temperature is high, the seated person may end up being warmed excessively. In particular, with a vehicle seat, there is often a large difference between the temperature of the environment outside the vehicle and the seat temperature inside the vehicle cabin, and a seated person who had been outside the vehicle needs to be heated appropriately when the heater is turned on (i.e., is started up). Also, with the heater unit described in WO2007/097445, the amount of electric power is increased to improve rapid heating ability, by turning on one heater until a certain temperature is reached (i.e., until a thermostat operates) when the heater is started up. However, two heaters must be provided together, which makes the structure complex. Furthermore, the connective state of the heaters changes according to the thermostat provided in the seat, so the heat at startup may end up being excessive or insufficient due to the relationship with the outside air temperature.

SUMMARY OF THE INVENTION

The invention thus provides a heater control unit that provides heat according to an environmental temperature to a seated person at startup of a heater provided in a seat, and a vehicle seat heater provided with this heater control unit.

One aspect of the invention relates to a heater control unit that controls electric power supplied to a heater provided in a seat. This heat control unit includes an outside air temperature measuring portion that measures an outside air temperature, a seat surface temperature measuring portion that measures a surface temperature of the seat, and a control portion that controls a time for which an initial electric power larger than an electric power in a steady state after the initial state is output to the heater, according to the measured outside air temperature and the measured seat surface temperature in an initial state immediately after the heater is activated. Also, the time for which the initial electric power is output may be set to be shorter the higher at least one of the outside air temperature and the seat surface temperature is.

Accordingly, the seat heater is able to have optimal rapid heating ability based on the relationship between the outside air temperature and the seat surface temperature. For example, when the outside air temperature and the seat surface temperature are both low, the time for which the initial electric power is supplied to the heater is increased, so a seated person that is cold from being in the outside air is able to be sufficiently warmed up. Also, when the seat surface temperature is low but the outside air temperature is high, the initial electric power supply time is decreased so that it is relatively short, thus making it possible to prevent a seated person that is warm from being in the outside air from being warmed too much. In this way, it is possible to perform temperature control of the heater that quickly provides heat to a seated person and, in addition, is suited to the environment condition and thus does not provide too much or too little heat, by controlling the electric power at startup of the heater according to the outside air temperature and the seat surface temperature, as well as the difference between the two.

Also, in the aspect described above, a first outside air temperature and a second outside air temperature that is higher than the first outside air temperature may be set, and a first seat surface temperature and a second seat surface temperature that is higher than the first seat surface temperature may be set. Also, in the initial state, the control portion may i) output the initial electric power for a predetermined period of time in a low temperature range in which the outside air temperature is equal to or less than the first outside air temperature and the seat surface temperature is equal to or less than the first seat surface temperature, ii) set the time for which the initial electric power is output to zero in a high temperature range in which the outside air temperature is greater than the second outside air temperature or the seat surface temperature is greater than the second seat surface temperature, and iii) make the time for which the initial electric power is output shorter than the predetermined period of time and the time for which the initial electric power is output shorter as one or both of the outside air temperature and the seat surface temperature is higher when the outside air temperature and the seat surface temperature are between the low temperature range and the high temperature range.

Accordingly, it is possible to eliminate insufficient warming by providing sufficient heat to the seated person in the low temperature range, and avoid providing too much heat to the seated person in the high temperature range. Also, in the temperature range between the low temperature range and the high temperature range, rapid heating in the initial state can be inhibited the higher the outside air temperature is even if the seat surface temperature is the same, and the higher the seat surface temperature is even if the outside air temperature is the same, and the higher the seat surface temperature and the outside air temperature are. As a result, temperature control suited to the environment condition can be easily performed.

Also in the aspect described above, the control portion may stop output of the initial electric power when the seat surface temperature reaches a predetermined temperature within the time for which the initial electric power is output.

Accordingly, when it is determined that the target temperature set by a switch or the like is reached, initial state control ends, and a shift can be made to equilibrium control (i.e., steady-state control) based on a desired target temperature.

Also, in the aspect described above, two or more levels of different amounts of electric power may be set in the initial electric power, and the control portion may output the electric powers of the levels for predetermined periods of time in order from the largest amount of electric power.

Accordingly, in the period of the initial state, the supply of electric power to the heater and the time for which this electric power is supplied can be distributed to match the outside air temperature and the seat surface temperature. As a result, the target temperature can be reached smoothly so discomfort to the seated person due to a sudden change in temperature can be reduced.

Also, the heater control unit may be provided in a vehicle seat heater.

According to the vehicle seat heater provided with the heater control unit described above, when the seat heater is turned on (i.e., started), optimal heat according to the outside air temperature and the seat surface temperature can be quickly provided to a seated person. Also, there is no need to provide a special heater for rapidly heating when the seat heater is turned on, so neither the number of parts of the seat heater nor the number of assembly hours will increase, and the seat can be made lighter, at a lower cost, and more reliable.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A heater control unit and a vehicle seat heater of the invention will be described in detail with reference to FIGS. 1 to 10. This heater control unit is a heater control unit that controls the temperature by controlling the electric power supplied to a heater provided in a seat. The seat provided with the heater control unit is not particularly limited. That is, the heater control unit of the invention may be applied to any of a variety of seats to be used in a vehicle or indoors, for example. The heater control unit may be used as a control unit of a heater provided in a vehicle seat (i.e., a vehicle seat heater) or as a portion of this control unit.

Figure 1:
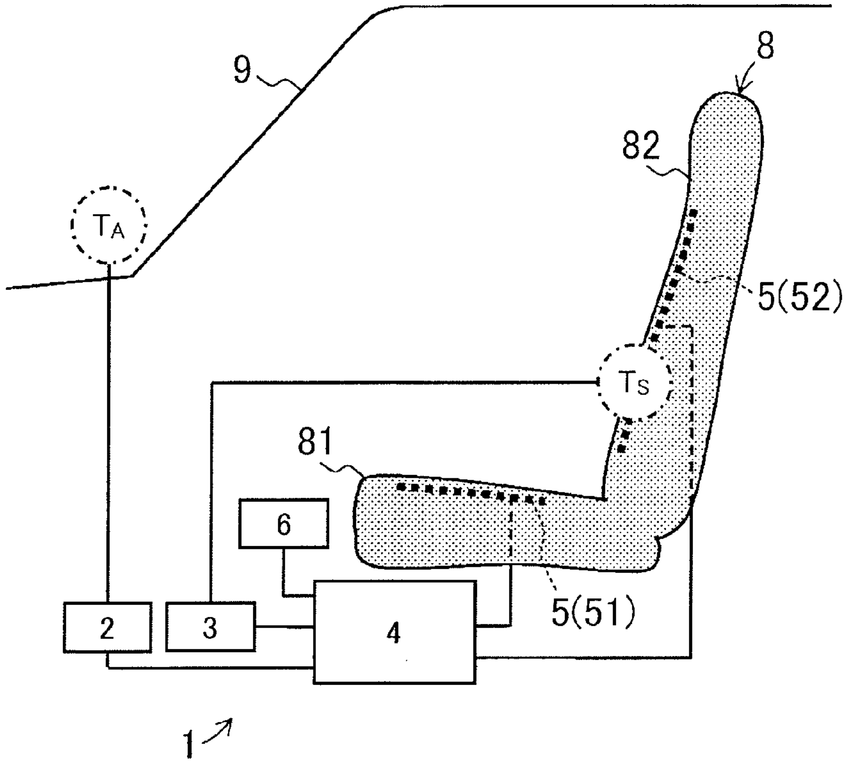
FIG. 1 is a block diagram of the structure of a heater control unit according to one example embodiment of the invention.

FIG. 1 is a view of the structure of a seat in a vehicle cabin, and the heater control unit 1 provided with this seat. A vehicle seat 8 provided in a cabin of a vehicle 9 includes a sitting surface portion 81 and a backrest portion 82. A heater (i.e., a heating element) 5 for heating the body of a seated person is incorporated into the seat 8. In the seat 8, a heater 51 is provided in a surface layer portion of the sitting surface portion 81 that contacts the seated person, and a heater 52 is provided in a surface layer portion of the backrest portion 82. The heater control unit 1 includes an outside air temperature measuring portion 2 for measuring an outside air temperature $T_A$, a seat surface temperature measuring portion 3 for measuring a surface temperature $T_S$ of the seat 8, and a control portion 4 that controls the electric power supplied to the heater 5 (51 and 52 and the like). The amount of electric power supplied to heater 5 is controlled by the control portion 4, and the amount of heat that is generated changes according to this amount of electric power.

Typically, an operating switch 6 or the like for turning the seat heater on and off and adjusting the temperature is provided with the seat heater. The heater control unit 1 is started up (i.e., activated) by the operating switch 6 or the like. Also, the heater control unit 1 is controlled according to a target temperature set by the operating switch 6. The heater control unit 1 is designed to provide heat quickly and of an appropriate amount (i.e., that is neither excessive nor insufficient) in the startup period immediately after the seat heater is activated (also referred to as the "initial state"). After the initial state, the temperature of the seat heater is controlled to match the target temperature (i.e., referred to as a "steady state"). The method by which the temperature is controlled in this steady state may be determined as appropriate. In the initial state, the heater control unit 1 is able to rapidly raise the temperature of the seat by supplying the heater 5 with more electric power (referred to as "initial electric power") than is supplied in the steady state. Therefore, the control portion 4 is configured to control the time for which the initial electric power is output to the heater 5 in the initial state.

The heater 5 may be a heater that is used both in the initial state and in the steady state, or it may be a heater for rapidly heating in the initial state. The number, arrangement, shape, and size and the like of heaters provided in a single seat are not particularly limited as long as they are able to heat parts of the body of a seated person contacting the seat. For example, one heater may be provided in one seat, or heaters may be provided corresponding to different parts of the body (e.g., the back, the lower back, the buttocks, the thighs) of a seated person. When the heater is provided divided into a plurality of heaters, the control portion 4 may control the amount of electric power separately for each heater to match the heat generating and dissipating characteristics of each part, as well as the sensation of warmth that differs depending on the part of the body. The material and structure of the heater 5 is not particularly limited. For example, a resistance heating wire or a sheet heating element or the like may be used. Each heating element is preferably provided in a surface layer portion of the seat that contacts the seated person. This surface layer portion includes a seat cover that is integrated with the seat and is provided covering the outer surface of the seat. For example, the heaters 51 and 52 may be provided between a seat cover and a cushion provided inside of the sitting surface portion 81 and the backrest portion 82.

The outside air temperature measuring portion 2 is provided to measure the temperature outside of the cabin (i.e., outside air temperature $T_A$), and the specific structure and location where it is arranged and the like may be determined as appropriate. For example, a temperature sensor may be provided as the outside air temperature measuring portion 2, and the outside air temperature may be measured directly, or information related to the outside air temperature measured by a system separate from the heater control unit 1 may be obtained by the outside air temperature measuring portion 2.

The seat surface temperature measuring portion 3 is provided to measure the seat surface temperature $T_S$ of the seat 8, and is provided in a portion where it is able to measure a change in temperature according to the power supplied to the heater 5. For example, a temperature sensor is provided around a heater provided corresponding to the back or the buttocks of a seated person. Therefore, even if the physical build such as the height of the seated person is different, or even if the seated posture changes, the body will often be contacting the seat surface at this location, so the seat surface temperature $T_S$ is able to be stably measured. The number and type and the like of temperature sensors used for the outside air temperature measuring portion 2 and the seat surface temperature measuring portion 3 are not particularly limited. For example, a well-known temperature measuring element such as a thermistor or a thermocouple may be used.

The control portion 4 is activated by the operating switch 6 or the like, and is configured to control the time for which the initial electric power is output to the heater 5, according to the measured outside air temperature $T_A$ and the measured seat surface temperature $T_S$. The control portion 4 may be formed by only hardware, or it may be formed by hardware and software using a microprocessor and the like. The method of controlling the electric power (i.e., the amount of power) supplied to the heater 5 may be selected as appropriate. For example, the amount of power may be controlled by pulse-width modulation (PWM), voltage control, or current control or the like, by a microprocessor. Also, the power supply of the heater control unit 1 and the heater 5 may be configured to receive power supplied from a battery of the vehicle, for example.

Figure 2:
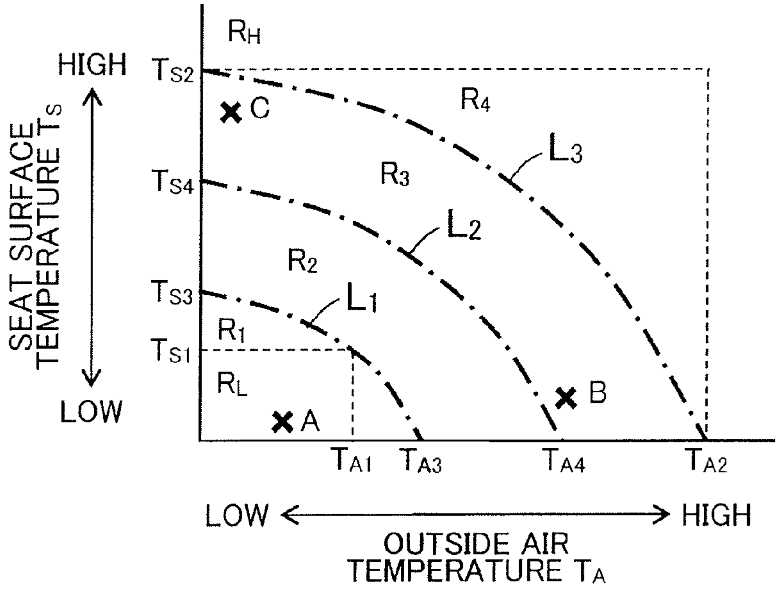
FIG. 2 is a view illustrating a control method of the heater control unit, according to outside air temperature and a seat surface temperature.

The horizontal axis in FIG. 2 represents the outside air temperature $T_A$, and the vertical axis represents the seat surface temperature $T_S$. In the initial state immediately after the heater is activated, the control portion 4 measures the outside air temperature $T_A$ with the outside air temperature measuring portion 2 and measures the seat surface temperature $T_S$ with the seat surface temperature measuring portion 3, and then controls the time for which the initial electric power is output to the heater, according to the measured outside air temperature $T_A$ and the measured seat surface temperature $T_S$.

Here, when the outside air temperature $T_A$ is low and the seat surface temperature $T_S$ is also low (referred to as a "low temperature range"), a person who is outside the cabin and is cold, who then enters the cabin and sits on the cold seat (i.e., a seated person), needs to be quickly warmed up. Therefore, the temperature of the seat heater is raised sufficiently and rapidly by outputting a large amount of initial electric power for a predetermined period of time. On the other hand, when the outside air temperature $T_A$ is high and the seat surface temperature $T_S$ is also high (referred to as a "high temperature range"), a person that enters the cabin from outside where it is warm and sits on the warm seat (i.e., a seated person) should not be excessively warmed by the seat heater. Therefore, the time for which a large amount of initial electric power is supplied is set to zero (0), i.e., initial state control is omitted. Also, when the outside air temperature $T_A$ and the seat surface temperature $T_S$ are between the low temperature range and the high temperature range (referred to as a "middle temperature range"), a temperature increase in the initial state of the seat heater is able to be made appropriate by making the time for which the initial electric power is output shorter than the predetermined period of time, the higher one or both of the outside air temperature $T_A$ and the seat surface temperature $T_S$ is.

For example, as high and low references for the outside air temperature $T_A$, a first outside air temperature $T_{A1}$ and a second outside air temperature $T_{A2}$ that is higher than the first outside air temperature $T_{A1}$ are set in advance. The first outside air temperature $T_{A1}$ is set to a temperature at or below which a person normally feels cold when he or she is outside the cabin. The second outside air temperature $T_{A2}$ is set to a temperature above which a person normally feels warm. Also, as high and low references for the seat surface temperature $T_S$, a first seat surface temperature $T_{S1}$ and a second seat surface temperature $T_{S2}$ that is higher than the first seat surface temperature $T_{S1}$ are set in advance. The first seat surface temperature $T_{S1}$ is set to a temperature at or below which, when a person contacts the seat, the seat normally feels cold. The second seat surface temperature $T_{S2}$ is set to a temperature above which the seat normally feels warm. Therefore, the temperature is divided into three ranges depending on the outside air temperature $T_A$ and the seat surface temperature $T_S$. These three ranges are i) a low temperature range in which the outside air temperature is equal to or lower than the first outside air temperature $T_{A1}$ and the seat surface temperature is equal to or lower than the first seat surface temperature $T_{S1}$, ii) a high temperature range in which the outside air temperature exceeds the second outside air temperature $T_{A2}$ or the seat surface temperature exceeds the second seat surface temperature $T_{S2}$, and iii) a middle temperature range that is between the lower temperature range and the high temperature range. Also, control is performed such that in the low temperature range, the initial electric power is output for a predetermined period of time, and in the high temperature range, the time for which the initial electric power is output is set to zero (0), and in the middle temperature range, the time for which the initial electric power is output is set shorter than the predetermined period of time the higher one or both the outside air temperature $T_A$ and the seat surface temperature $T_S$ is.

More specifically, the middle temperature range is further divided into two, such that the supply of the initial electric power is controlled divided into the four ranges shown in FIG. 2. Boundary lines that connect outside air temperatures $T_{A3}$, $T_{A4}$, and $T_{A2}$ along the horizontal axis in FIG. 2 to the seat surface temperatures $T_{S3}$, $T_{S4}$, and $T_{S2}$ along the vertical axis are designated $L_1$, $L_2$, and $L_3$, respectively. The shapes of these boundary lines (the setting method) may be determined as appropriate. Also, when the outside air temperature $T_A$ and the seat surface temperature $T_S$ are within a range $R_1$ that is equal to or lower than the boundary line $L_1$, the initial electric power is supplied for a predetermined period of time. The low temperature range $R_L$ is included in this range. Also, when the outside air temperature $T_A$ and the seat surface temperature $T_S$ are within a range $R_2$ that is above the boundary line $L_1$ and equal to or lower than the boundary line $L_2$, the initial electric power supply time is made shorter than the predetermined period of time to inhibit an increase in the temperature. Further, when the outside air temperature $T_A$ and the seat surface temperature $T_S$ are in a range $R_3$ that is above the boundary line $L_2$ and equal to or lower than the boundary line $L_3$, the initial electric power supply time is made even shorter. Moreover, when the outside air temperature $T_A$ and the seat surface temperature $T_S$ are in a range $R_4$ above the boundary line $L_3$, the initial electric power supply time zero (0) so that rapid heating is not performed. The high temperature range $R_H$ is included in this range.

When control is performed as described above and the outside air temperature $T_A$ and the seat surface temperature $T_S$ are both low (point A in the range $R_L$ shown in FIG. 2), sufficient heat is able to be provided to a seated person immediately after the person sits down. However, when the seat surface temperature $T_S$ is low but the outside air temperature $T_A$ is high (point B in range $R_3$), the initial electric power supply time is shortened, so excessive heat will not be provided to the seated person. Also, when the seat surface temperature $T_S$ is high but the outside air temperature $T_A$ is low (point C in the range $R_3$) as well, the initial electric power supply time is shortened, so excessive heat will not be provided to the seated person. That is, appropriate heat is able to be provided to a seated person according to the outside air temperature $T_A$ and the seat surface temperature $T_S$.

Figure 10:
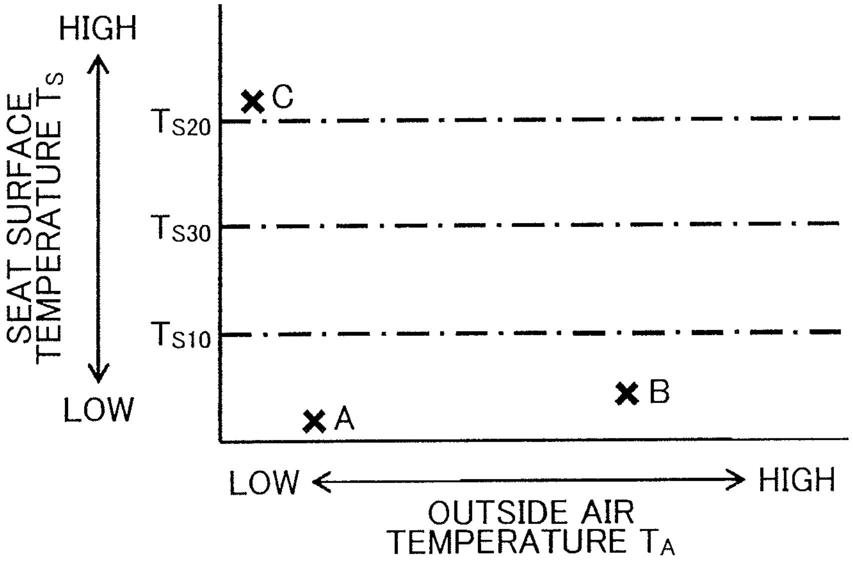
FIG. 10 is a view of a related control method.

In contrast to the control according to the heater control unit 1, related control that does not take into account high and low outside air temperatures is shown in FIG. 10. For example, three boundaries, i.e., seat surface temperatures $T_{S10}$, $T_{S30}$, and $T_{S20}$, are set according to the relationship with a target temperature. Then when the seat surface temperature is equal to or less than $T_{S10}$, the temperature of the seat heater is rapidly raised by supplying the initial electric power for a certain period of time. On the other hand, when the seat surface temperature is higher than $T_{S20}$, the time for which the initial electric power is supplied is set to zero (0) so the temperature of the seat heater will not increase. Also, when the seat surface temperature is between $T_{S10}$ and $T_{S20}$, an increase in the temperature of the seat heater is able to be made appropriate by making the time for which the initial electric power is output shorter than the certain period of time. Points A, B, and C in FIG. 10 correspond to points A, B, and C in FIG. 2.

However, even if the seat surface temperature $T_S$ is low to the same degree, initial electric power of the same degree will be supplied when the outside air temperature $T_A$ is low (point A in FIG. 10) as when the outside air temperature $T_A$ is high (point B), so there will either be not enough heat at point A or too much heat at point B. That is, if sufficient heat is provided when the seat surface temperature is low and the outside air temperature is low, it will be too warm when the outside air temperature is high. Conversely, if appropriate heat is provided when the outside air temperature is high, it will not be warm enough when the outside air temperature is low. Further, when the seat surface temperature $T_S$ is high, the initial electric power supply time is shortened, so when the outside air temperature is low (point C), the seated person will be unable to be sufficiently warmed up.

Figures 3, 4:
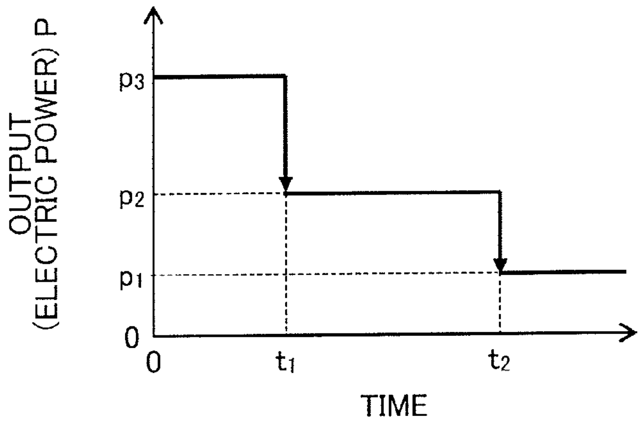
FIG. 3 is a graph of an example of initial electric power and output time thereof.
FIG. 4 is a chart showing a detailed example of setting the output time shown in FIG. 3 according to the outside air temperature and the seat surface temperature.

Moreover, the heater control unit 1 sets at least two levels of different amounts of electric power as the initial electric power. The control portion 4 is able to output the electric power of each of the levels for a predetermined period of time in order of the largest amount of electric power. FIG. 3 shows an example in which initial electric powers P of different amounts are sequentially output to the heater. Here, the electric power $p_1$ denotes electric power output in the steady state. For example, the electric power $p_1$ may be electric power for maintaining a target temperature set by the operating switch 6 or the like. The electric power to realize the target temperature in the steady state may be increased and decreased or controlled on and off by an appropriate method. In FIG. 3, two levels of electric power, i.e., electric power $p_2$ that is larger than the electric power $p_1$, and electric power $p_3$ that is even larger than the electric power $p_2$, are set as the initial electric power. The electric power values of these may be set appropriately. For example, when the electric power $p_1$ is approximately 60 W, the electric power $p_2$ may be 120 W, and the electric power $p_3$ may be 240 W or the like. Also, the number of levels that are set is arbitrary. That is, one level may be set, or small levels may be set such that the electric power value changes almost continuously (i.e., smoothly).

The horizontal axis in FIG. 3 represents the time after the seat heater (i.e., the heater control unit 1) has been activated (i.e., started up). The control portion 4 starts to supply the largest amount of electric power $p_3$ at startup, and then reduces the output to the electric power $p_2$ when time $t_1$ has passed. Then the control portion 4 reduces the output to the electric power $p_1$ when the time $t_2$ has passed after startup. Outputting the electric power in levels starting with the largest amount of electric power in this way makes it possible to raise the temperature of the seat heater quickly, and shift into the steady state without imparting discomfort to the seated person due to heat being suddenly generated. The output times of the levels may be set appropriately. For example, the output times of the levels may be set as predetermined times according to the temperature ranges of the outside air temperature $T_A$ and the seat surface temperature $T_S$, or they may be calculated according to the outside air temperature $T_A$, the seat surface temperature $T_S$, and the target temperature.

FIG. 4 is a view illustrating an example of a control chart for controlling the initial state according to the outside air temperature and the seat surface temperature, that combines the initial powers of the two levels shown in FIG. 3 with the supply times. In this example, the outside air temperature $T_A$ is divided into five ranges, with −15° C., −5° C., 5° C., and 15° C. as boundaries, and the seat surface temperature $T_S$ is divided into three ranges, with 10° C. and 30° C. as boundaries. The times $t_1$ and $t_2$ are set for each of the 15 temperature ranges. For example, when the outside air temperature is the lowest, i.e., equal to or less than −15° C., and the seat surface temperature is low, i.e., equal to or less than 10° C., the maximum electric power $p_3$ is output for 140 seconds ($t_1$), and then the electric power $p_2$ is output for 40 seconds ($t_2-t_1$). On the other hand, if the outside air temperature is above 15° C., the initial electric powers $p_3$ and $p_2$ are not output ($t_1=0$ and $t_2=0$) regardless of the seat surface temperature. Also, in the other temperature ranges, the times for which the initial electric powers ($p_3$ and $p_2$) are output (i.e., $t_1$ and $t_2-t_1$) are determined according to the outside air temperature and the seat surface temperature.

Figure 5:
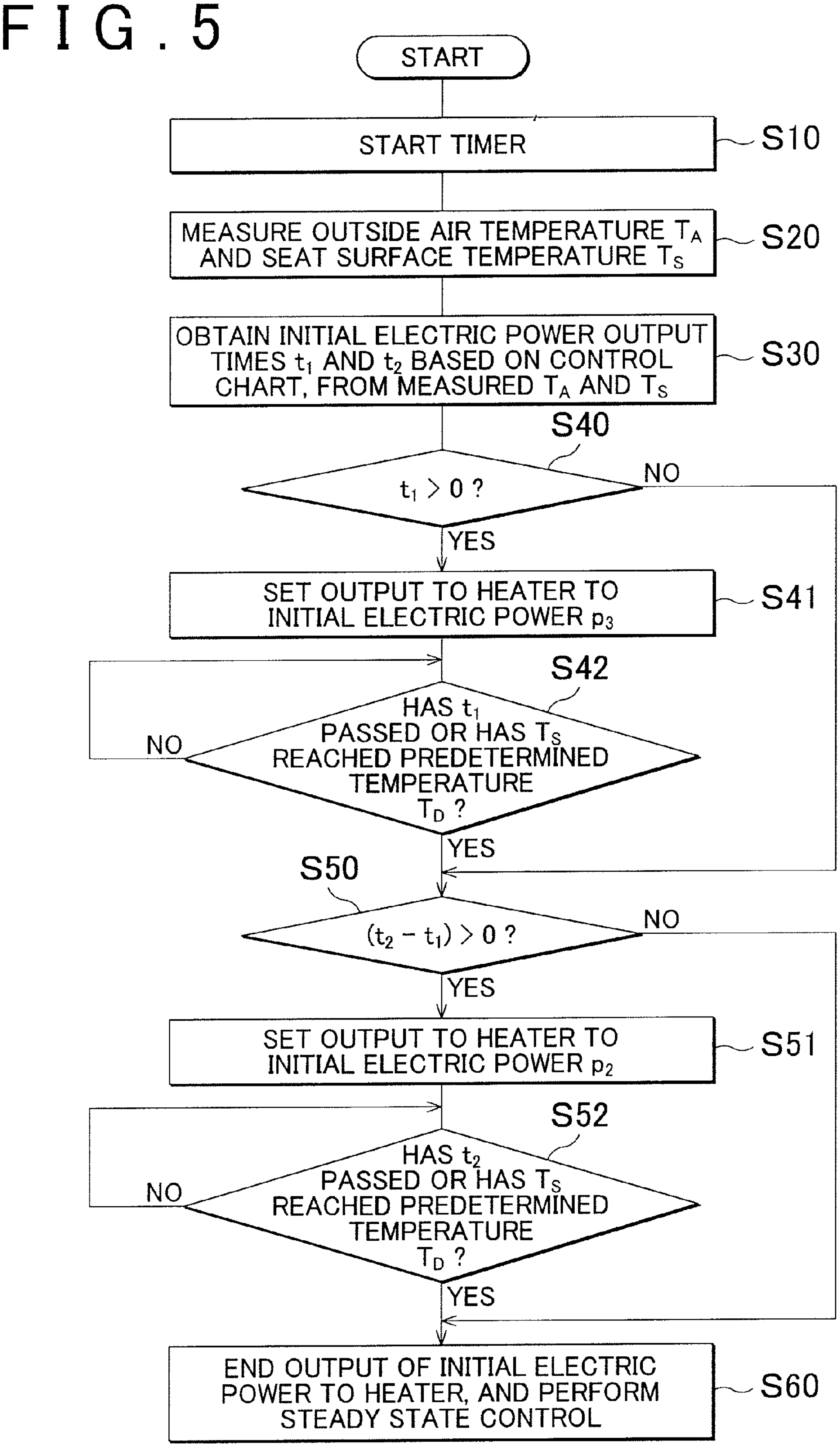
FIG. 5 is a flowchart illustrating an example of a control routine of the heater control unit.

FIG. 5 is a flowchart illustrating the flow of a routine that is executed when performing the control shown in FIG. 4. When the seat heater is activated, control starts, and first a timer for controlling the initial electric power supply time is started (S10). Also, the outside air temperature $T_A$ and the seat surface temperature $T_S$ are measured (S20). Then a time ($t_1$ and $t_2$) for supplying the initial electric power for the measured outside air temperature $T_A$ and the measured seat surface temperature $T_S$ is obtained (S30) based on a control chart and the like stored in advance. In step S40, it is determined whether the time $t_1$ is greater than 0. If the time $t_1$ is not 0, output to the heater is set to the electric power $p_3$, and output is started (S41). This output continues until time $t_1$ passes (S42). Also, in step S42, the seat surface temperature $T_S$ may be measured and the initial electric power may stop being output when it has reached a predetermined temperature $T_D$. The predetermined temperature $T_D$ may be a temperature that is lower than the target temperature, and may be set so as not to exceed the target temperature according to the current output. If in step S40 the time $t_1$ is 0, steps S41 and S42 are skipped.

Next, in step S50, it is determined whether the time ($t_2-t_1$) is greater than 0. If the time ($t_2-t_1$) is not 0, then the output to the heater is set to the electric power $p_2$, and output is started (S51). This output continues until time $t_2$ passes (S52). Also, in step S52, the seat surface temperature $T_S$ may be measured and the initial electric power may stop being output when it has reached the predetermined temperature $T_D$, just as in step S42. If in step S50 the time ($t_2-t_1$) is 0, steps S51 and S52 are skipped. With the above steps, output of the initial electric power ends, i.e., the initial state ends, and the process proceeds on to steady state control (S60).

The control described above may be modified in any of a variety of ways. For example, the seat surface temperature $T_S$ may be measured cyclically, and the output time and amount of electric power that is output may be changed according to the temperature increase. Also, the amount of the initial electric power is divided into two levels, but it may also be only one level, or three or more small levels may be provided. Also, the output time and amount of the electric power may be obtained by a calculation determined in advance from the temperature measurement value, instead of from the control chart. Further, in the description above, the predetermined temperature $T_D$ is set, and output is stopped when it approaches a target temperature set by the operating switch or the like. Alternatively, however, the output time and amount of the electric power may also be changed according to the rate of increase in the seat surface temperature or the like.

The heater control unit 1 described above may be suitably used for startup control of a vehicle seat heater. This is because when used in a vehicle, there is often a large difference between warm and cold in the usage environment, and the temperature difference between the outside air temperature and the temperature inside the vehicle cabin is often large.

Figure 6A:
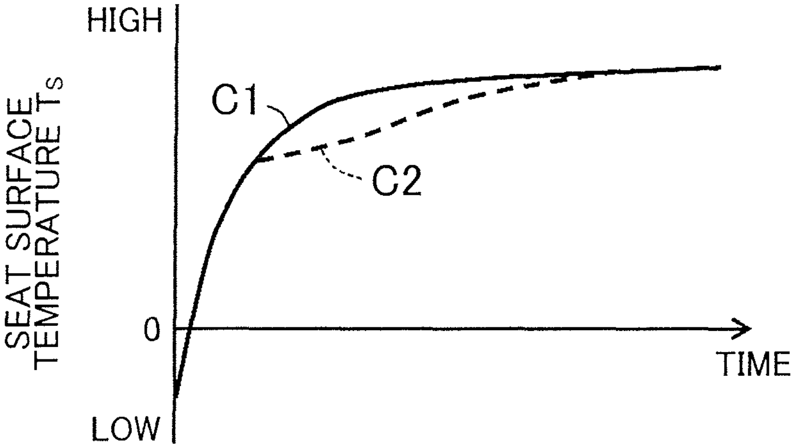
FIG. 6A is a graph showing a change in the seat surface temperature after the heater is started up, when both the outside air temperature and the seat surface temperature are low at startup.
Figure 6B:
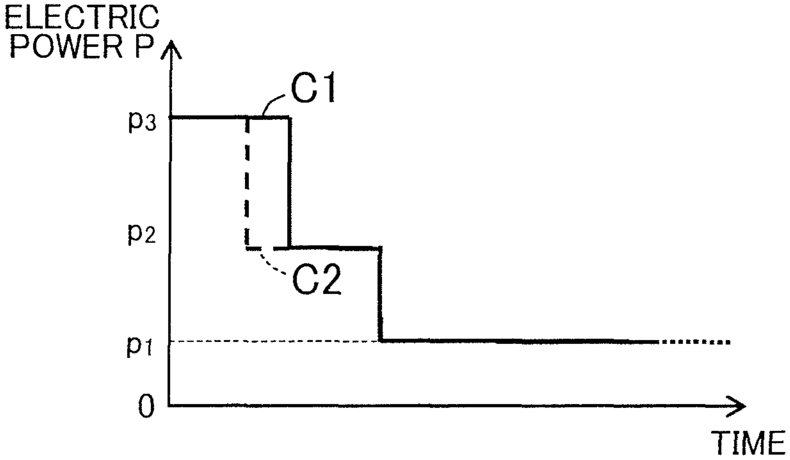
FIG. 6B is a graph showing a change in the initial electric power after the heater is started up, when both the outside air temperature and the seat surface temperature are low at startup.
Figure 7A:
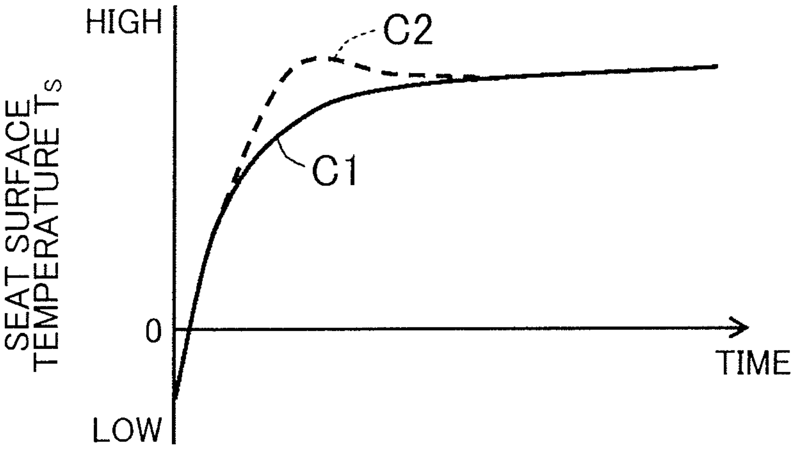
FIG. 7A is a graph showing the change in the seat surface temperature after the heater is started up, when the outside air temperature is high and the seat surface temperature is low at startup.
Figure 7B:
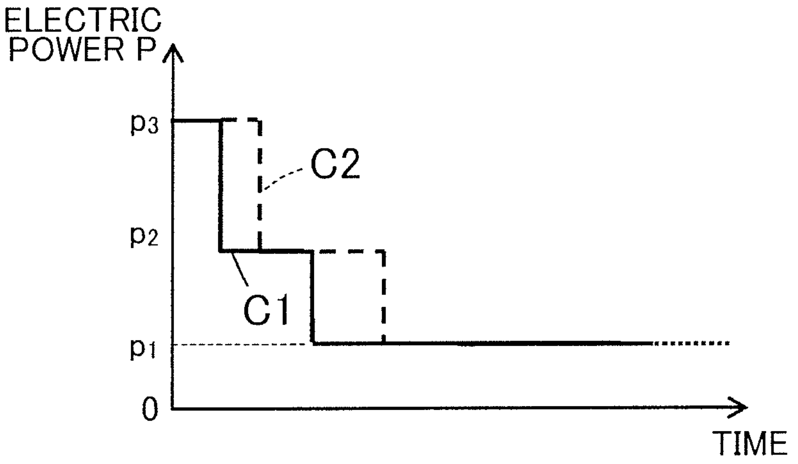
FIG. 7B is a graph showing the change in the initial electric power after the heater is started up, when the outside air temperature is high and the seat surface temperature is low at startup.
Figure 8A:
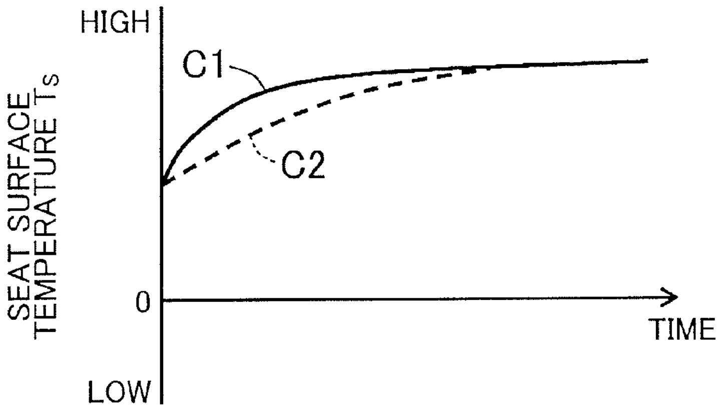
FIG. 8A is a graph showing the change in the seat surface temperature after the heater is started up, when the outside air temperature is low and the seat surface temperature is high at startup.
Figure 8B:
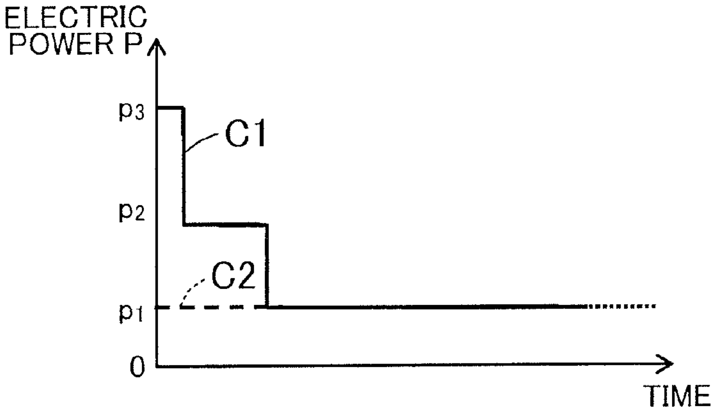
FIG. 8B is a graph showing the change in the initial electric power after the heater is started up, when the outside air temperature is low and the seat surface temperature is high at startup.
Figure 9:
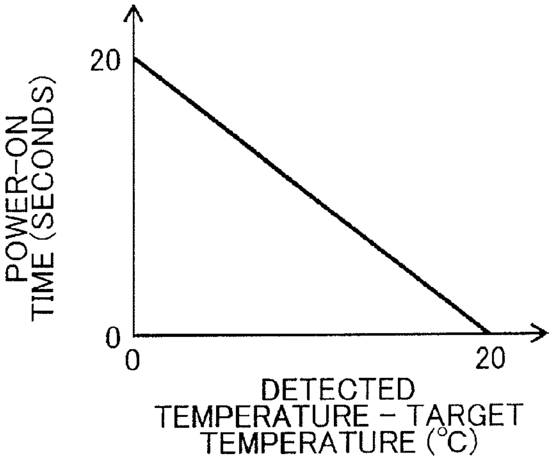
FIG. 9 is a graph showing an example of related heater control.

FIGS. 6 to 8 are views of control of a vehicle seat heater provided with the heater control unit 1, and the results from that control. FIGS. 6A, 7A, and 8A show a change in the seat surface temperature $T_S$ after startup, and FIGS. 6B, 7B, and 8B show a change in the electric power P output to the heater by the same time axis as in FIGS. 6A, 7A, and 8A. Also, in the drawings, the solid line C1 shows a case in which control was performed by the heater control unit 1 (see FIG. 2), and the broken line C2 shows related control. Here, the related control is control that does not take the outside air temperature into account. The example of control shown in FIG. 10 is one in which two levels of electric power ($p_3$ and $p_2$) are output.

FIGS. 6A and 6B are views of a case in which both the outside air temperature $T_A$ and the seat surface temperature $T_S$ are low at startup (this corresponds to point A shown in FIGS. 2 and 10). With the related control C2, a wide outside temperature range is uniformly controlled, so in this kind of low temperature range, the supply of the initial electric power is insufficient, and an increase in the seat surface temperature $T_S$ is slowed. As a result, the time required to raise the seat surface temperature $T_S$ to the desired temperature (i.e., the target temperature) increases, and sufficient heat is unable to be quickly provided to a seated person that has entered the vehicle from a cold environment. In contrast, with the control C1 according to the heater control unit, a large amount of electric power $p_3$ is output for an extended period of time according to how low the outside air temperature $T_A$ is. As a result, the seat surface temperature $T_S$ will rise quickly such that sufficient heat can quickly be provided to the seated person.

FIGS. 7A and 7B are views of a case in which, at startup, the outside air temperature $T_A$ is high but the seat surface temperature $T_S$ is low (this corresponds to point B in FIGS. 2 and 10). With the related control C2, a wide outside air temperature range is uniformly controlled, so even when the outside air temperature is high as it is in this case, a large amount of initial electric power $p_3$ will be output for a relatively long period of time, and consequently, the seat surface temperature $T_S$ ends up increasing too much. As a result, excessive heat is applied to a seated person that has entered the vehicle from a warm environment. On the other hand, with the control C1 by the heater control unit of this example embodiment, the output time of the initial electric power $p_3$ and $p_2$ is shortened according to how high the outside air temperature $T_A$ is, so the seat surface temperature $T_S$ is inhibited from increasing, and thus excessive heat will not be provided to the seated person.

FIGS. 8A and 8B are views of a case in which, at startup, the outside air temperature $T_A$ is low but the seat surface temperature $T_S$ is high (this corresponds to point C in FIGS. 2 and 10). With the related control C2, even when the outside air temperature is low as it is in this case, the initial electric power will not be output if the seat surface temperature $T_S$ is in the middle temperature range, so at startup, operation that specifically increases the seat surface temperature $T_S$ will not be performed. As a result, heat is unable to be quickly provided to a seated person that has entered the vehicle from a cold environment, so the seated person will be not be able to be warmed up quickly. In contrast, with the control C1 by the heater control unit according to the example embodiment, even if the seat surface temperature $T_S$ is in the middle temperature range, if the outside air temperature $T_A$ is low, the initial electric powers $p_3$ and $p_2$ will be output for short periods of time accordingly, so the seat surface temperature $T_S$ will quickly rise, thus enabling appropriate heat to be provided to the seated person.

As described above, this heater control unit and the vehicle seat heater provided therewith measure the outside air temperature and the seat surface temperature, and are able to quickly provide suitable heat to a seated person sitting in a seat in the cabin after being in an environment outside the cabin, according to those how high or low those temperatures are.

The invention is not limited to the example embodiments described above, but may be carried out in various modified modes within the scope of the invention according to the intended use.

What is claimed is:

1. A heater control unit that controls electric power supplied to a heater provided in a seat, comprising:
- an outside air temperature sensor that measures an outside air temperature;
- a seat surface temperature sensor that measures a surface temperature of the seat; and
- a controller that communicates with the outside air temperature sensor and the seat surface temperature sensor and determines a time period for which an initial electric power is output to the heater during an initial heating state of the seat based on the measured outside air temperature and the measured seat surface temperature, wherein
- when the time period is determined, the controller is configured to supply the initial electric power to the heater provided in the seat for the determined time period, and
- when the time period expires, the controller is configured to supply an electric power to the heater provided in the seat that is less than the initial electric power.

2. The heater control unit according to claim 1, when at least one of the measured outside air temperature and the measured seat surface temperature equals or exceeds a threshold high temperature level, the time period for which the initial electric power is output is set to be shorter than a time period when the at least one of the measured outside air temperature and the measured seat surface temperature falls below the threshold high temperature level.

3. The heater control unit according to claim 1, wherein
- a first predetermined outside air temperature and a second predetermined outside air temperature that is higher than the first predetermined outside air temperature are stored in the controller; and
- a first predetermined seat surface temperature and a second predetermined seat surface temperature that is higher than the first predetermined seat surface temperature are stored in the controller, and
- in the initial heating state, the controller outputs the initial electric power for a predetermined period of time in a low temperature range in which the measured outside air temperature is equal to or less than the first predetermined outside air temperature and the measured seat surface temperature is equal to or less than the first predetermined seat surface temperature,
- the controller sets the time period for which the initial electric power is output to zero in a high temperature range in which the measured outside air temperature is greater than the second predetermined outside air temperature or the measured seat surface temperature is greater than the second predetermined seat surface temperature, and
- the controller sets the time for which the initial electric power is output shorter than the predetermined period of time and the time period for which the initial electric power is output shorter as at least one of the measured outside air temperature and the measured seat surface temperature is higher when the measured outside air temperature and the measured seat surface temperature are between the low temperature range and the high temperature range.

4. The heater control unit according to claim 1, wherein when the seat surface temperature reaches a predetermined temperature within the time period for which the initial electric power is output, the controller stops output of the initial electric power.

5. The heater control unit according to claim 1, wherein the output of the initial electric power includes two or more levels of electric power amounts, and the controller outputs the initial electric power during the predetermined time period in order from a higher electric power level to a lower electric power level.

6. The heater control unit according to claim 1, wherein the heater control unit is provided in a vehicle seat heater.

7. A heater control method for controlling electric power supplied to a heater provided in a seat, comprising:
- measuring an outside air temperature with an outside air temperature sensor and measuring a seat surface temperature with a seat surface temperature sensor, in an initial state immediately after the heater is activated; and
- controlling a time period for which an initial electric power is output to the heater during the initial state based on the measured outside air temperature and the measured seat surface temperature, the initial electric power being larger than an electric power output in a steady state after the initial state is output to the heater.

8. The heater control method according to claim 7, when at least one of the measured outside air temperature and the measured seat surface temperature equals or exceeds a threshold high temperature level, the time period for which the initial electric power is output is set to be shorter than a time period when the at least one of the measured outside air temperature and the measured seat surface temperature falls below the threshold high temperature level.

9. The heater control method according to claim 7, further comprising:

in the initial state, outputting the initial electric power for a predetermined period of time in a low temperature range in which the measured outside air temperature is equal to or less than a first predetermined outside air temperature and the measured seat surface temperature is equal to or less than a first predetermined seat surface temperature, setting the time period for which the initial electric power is output to zero in a high temperature range in which the measured outside air temperature is greater than a second predetermined outside air temperature or the measured seat surface temperature is greater than a second predetermined seat surface temperature, and making the time period for which the initial electric power is output shorter than the predetermined period of time and the time for which the initial electric power is output shorter as at least one of the measured outside air temperature and the measured seat surface temperature is higher when the measured outside air temperature and the measured seat surface temperature are between the low temperature range and the high temperature range.

* * * * *